United States Patent
Nam et al.

[11] Patent Number: 6,133,374
[45] Date of Patent: Oct. 17, 2000

[54] POLYPROPYLENE RESIN COMPOSITIONS

[75] Inventors: Byeong-Uk Nam; Young-Keun Lee; Tae-Hee Lee; Kyu-Jong Lee, all of Taejon, Rep. of Korea

[73] Assignee: SK Corporation, Seoul, Rep. of Korea

[21] Appl. No.: 09/218,272

[22] Filed: Dec. 21, 1998

[30] Foreign Application Priority Data

Dec. 23, 1997 [KR] Rep. of Korea ............... 97-72580
Jan. 21, 1998 [KR] Rep. of Korea ............... 98-1673

[51] Int. Cl.$^7$ .................................................. C08G 63/91
[52] U.S. Cl. ........................................ 525/65; 525/69
[58] Field of Search ..................................... 525/65, 69

[56] References Cited

U.S. PATENT DOCUMENTS

| | | | |
|---|---|---|---|
| 4,683,264 | 7/1987 | Urata et al. | 525/65 |
| 4,801,645 | 1/1989 | Nishio et al. | 525/68 |
| 4,946,896 | 8/1990 | Mitsuno et al. | 525/93 |
| 4,997,720 | 3/1991 | Bourbonais et al. | 428/500 |
| 5,037,885 | 8/1991 | Mori et al. | 525/65 |
| 5,266,634 | 11/1993 | Ito et al. | 525/67 |
| 5,409,991 | 4/1995 | Mitsuno et al. | 525/66 |
| 5,424,362 | 6/1995 | Hwang et al. | 525/71 |
| 5,486,561 | 1/1996 | Hirano et al. | 524/451 |
| 5,709,948 | 1/1998 | Perez et al. | 428/413 |
| 5,760,120 | 6/1998 | Itoh et al. | 524/431 |

FOREIGN PATENT DOCUMENTS

| | | |
|---|---|---|
| 05086262 | 4/1993 | Japan. |
| 07173362 | 7/1995 | Japan. |

*Primary Examiner*—Jeffrey C. Mullis
*Attorney, Agent, or Firm*—Abelman, Frayne & Schwab

[57] ABSTRACT

A polypropylene resin composition comprises (1) 40 to 99% by weight of a polypropylene resin; (2) 1 to 60% by weight of an ethylene/alpha-olefin copolymer elastomer; (3) 20 to 50 parts by weight of a low molecular weight polypropylene resin modified with unsaturated carboxylic acid or its anhydride, and (4) 0.1 to 20 parts by weight of an epoxy resin represented by the following chemical formula I:

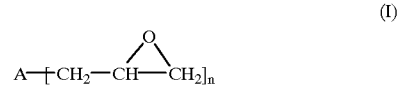

(I)

wherein n is an integer of 1 to 4 and A is a multivalent group having a bond number of n and is selected from bisphenol A-type ethers, propylene oxide-type ethers and ethylene oxide-type ethers, the components (3) and (4) being based on 100 parts by weight of the components (1) and (2) in total. The composition is suited for polypropylene materials to be painted, such as automobile bumpers, by virtue of its superior paint adhesion even under the condition of no pretreatments.

6 Claims, No Drawings

POLYPROPYLENE RESIN COMPOSITIONS

BACKGROUND OF THE INVENTION

1. Field of the Invention

The present invention relates to a polypropylene resin composition superior in coating properties. More particularly, the present invention relates to a polypropylene resin composition applicable for the products which needs painting, such as automobile bumpers.

2. Description of the Prior Art

Generally, the non-polarity of polypropylene makes it difficult to apply printing, bonding, and coating or painting on polypropylene-based products. To improve the coating properties of polypropylene-based products, much effort has been made, including the formation of a stable coating layer on the polypropylene-based products. For example, the adhesion between a polypropylene-based product and a paint coat can be improved by pretreatments, such as etching with halogenated hydrocarbons and primers. However, because the halogenated hydrocarbons of which 1,1,1-trichloroethane (TCE) is representative, are found to cause depletion of the ozone layer, their use is prohibited or severely regulated. The pretreatment with primers has an economical disadvantage of giving rise to an increase in the cost of the end product because the primers are usually expensive.

In addition, the polypropylene-based products of which surfaces are treated with chromic acid, flame, corona or plasma, are better printed or painted. However, these surface treatment techniques are still unsatisfactory in environmental and economical aspects.

With the aim of improving the coating properties of polypropylene-based products was disclosed a group of methods, which are based on physical and/or chemical modification, such as introduction of and/or blending with polar groups.

U.S. Pat. No. 4,946,896 discloses a polypropylene composition comprising 20 to 80% of polypropylene, 5 to 38% of a copolymer consisting of ethylene, alkyl acrylate or methacrylate and unsaturated carboxylic acid anhydride, and 5 to 70% of ethylene-polypropylene rubber. In this composition, the ethylenic copolymer plays a role as a polarity source, but is so poor in compatibility with polypropylene that deteriorated physical properties and non- uniform coating properties are attained.

U.S. Pat. No. 5,424,362 discloses a composition comprising 30 to 70% of polypropylene or graft-modified polypropylene, 0 to 40% of an ethylenic polymer or graft-modified ethylenic polymer, and 0 to 50% of an ethylene-unsaturated carboxylic acid copolymer. Owing to high molecular weights, the graft-modified polyolefins cannot be distributed effectively over the surface of injection-molded products. Thus, a large quantity of the modified polyolefin is needed to provide satisfactory coating properties to the products.

U.S. Pat. No. 4,997,720 discloses a composition comprising 1 to 50% polypropylene, 3 to 50% of an ethylene-alpha olefin copolymer, 2 to 25% of a copolymer of ethylene and unsaturated carboxylic acid, 2 to 20% of an epoxy or phenoxy resin, and optionally 50% or less of inorganic fillers. The copolymer of ethylene and unsaturated carboxylic acid is too high in molecular weight and poor in the compatibility with polypropylene to provide satisfactory coating properties.

U.S. Pat. No. 5,486,561 discloses a composition comprising 50 to 90% of polypropylene, 10 to 50% of ethylene- alpha olefin copolymer, and 0.1 to 15 weight parts of a polyolefin modified with a functional group, based on 100 weight parts of the polypropylene and the copolymer in total. However, the products made of this composition are required to be treated with primers prior to painting.

SUMMARY OF THE INVENTION

The intensive and thorough research repeated by the present inventors with the aim of developing a polypropylene composition which is environmentally and economically favorable, resulted in the finding that a composition containing a low molecular weight polypropylene resin modified with an unsaturated carboxylic acid or its anhydride can be painted after washing with aqueous solvent, instead of TCE and without any treatment of primers.

Therefore, it is an object of the present invention to overcome the above problems encountered in prior arts and to provide a polypropylene composition which shows excellent coating properties.

It is another object of the present invention to provide a polypropylene composition which requires no pretreatments when its molded products are painted.

In accordance with the present invention, the above objects could be accomplished by a provision of a polypropylene resin composition superior in coating properties, comprising (1) 40 to 99% by weight of a polypropylene resin; (2) 1 to 60% by weight of an ethylene/alpha-olefin copolymer elastomer; (3) 20 to 50 parts by weight of a low molecular weight polypropylene resin modified with unsaturated carboxylic acid or its anhydride, based on 100 weight parts of the components (1) and (2) in total and (4) 0.1 to 20 parts by weight of an epoxy resin represented by the following chemical formula I, based on 100 weight parts of the components (1) and (2) in total:

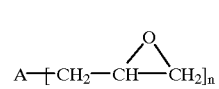

(I)

wherein n is an integer of 1 to 4 and A is a multivalent group having a bond number of n and is selected from the group consisting of bisphenol A-type ethers, propylene oxide-type ethers and ethylene oxide-type ethers.

DETAILED DESCRIPTION OF THE INVENTION

The present invention pertains to a polypropylene composition comprising (1) a polypropylene resin, (2) an ethylene/alpha-olefin copolymer elastomer, (3) a low molecular weight polypropylene resin modified with unsaturated carboxylic acid or its anhydride, and (4) a reactive epoxy resin.

As the component (1), examples of the polypropylene resin include crystalline polypropylene homopolymers, propylene/ethylene random copolymers, propylene/ethylene block copolymers, and ethylene/propylene/alpha-olefin terpolymers. In regard of the melt index of the polypropylene resin, it is not specifically limited, but is preferably on the order of 0.5 to 100 g/10 min and more preferably 0.5 to 50 g/10 min. Based on the total weight of the components (1) and (2), the polypropylene resin amounts preferably to 40 to 99% by weight and more preferably 40 to 90% by weight. For example, if the polypropylene resin is present at an amount of below 40% by weight, the composition shows poor physical properties. On the other hand, if the amount of the polypropylene resin exceeds 99% by weight, the resulting products are difficult to coat or paint.

As for the ethylene/alpha-olefin copolymer elastomer (2), it may be exemplified by a copolymer of ethylene and an alpha- olefin such as propylene, butene-1, hexene-1 or octene-1, or by a terpolymer of ethylene, alpha-olefine and a diene such as dicyclopentadiene, 1,4-hexadiene, dicyclooctadiene, methylene-norbornene or ethylene-norbornene. Preferred are the copolymers with the alpha-olefins, for example, the copolymers of ethylene and propylene, ethylene and butene-1, and ethylene and octene-1. The ethylene content in the ethylene/alpha-olefin copolymer elastomer is preferably on the order of 40 to 90% by weight and more preferably 50 to 85% by weight. Over- or under-content of the ethylene component leads to decreasing the physical properties of the compound. The ethylene/alpha-olefin copolymer elastomer ranges, in Mooney viscosity, preferably from 10 to 100 ($ML_{1+4}$, 100° C.) and more preferably from 15 to 70 ($ML_{1+4}$, 100° C.). For example, if the Mooney viscosity is below 10, there are provided poor physical properties. On the other hand, if the Mooney viscosity is over 100, the compound is not easy to process. The component (2) is present preferably at an amount of 1 to 60% by weight based on the total weight of the components (1) and (2).

Available for the low molecular weight polypropylene resin modified with unsaturated carboxylic acid or its anhydride are low molecular weight propylene homopolymers, propylene/ethylene random or block copolymers, and the mixtures thereof modified with unsaturated carboxylic acid or its anhydride, such as maleic anhydride, maleic acid, acrylic acid, methacrylic acid, fumaric acid, itaconic acid, crotonic acid, cinnamic acid, citraconic acid or citraconic anhydride with preference to polypropylene resin modified with maleic anhydride. The modified polypropylene resin may be prepared by a known process, e.g., a graft process in a melt or solution state. There are no specific limits to the content of unsaturated carboxylic acid or its anhydride in the component (3), but it is preferable in the aspect of coating properties that it amounts to 1 to 20% by weight of the total weight of the modified polypropylene resin. With regard to component (3), the term "low molecular weight" is intended to mean a number average molecular weight form 2,000 to 30,000 g/mol. The number average molecular weight less than 2,000 g/mol makes the resulting compound have insufficient physical properties whereas too a high number average molecular weight results in poor paintability. With respect to melt viscosity, the component (3) is preferably on the order of 20 to 10,000 cP at 190° C. as measured by a Brookfield viscometer. As in the number average molecular weight, the same results are brought into the physical properties and the paintability if the melt viscosity is out of the upper and the lower limits, respectively.

In accordance with the present invention, the component (3) is preferably added at an amount of 20 to 50 parts by weights per 100 parts by weight of the total amount of the components (1) and (2). For example, if the component (3) is present at an amount less than 20 part by weight, the end products are difficult to coat. On the other hand, the component (3) at more than 50 parts by weight deleteriously affects such physical properties as low temperature impact strength and elongation and also causes silver blistering upon injection because of an increase in hygroscopicity of the composition thus obtained.

In accordance with the present invention, the reactive epoxy resin (4) is represented by the following chemical formula I:

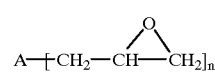

wherein A is a multivalent group having a bond number of n and n is an integer of 1 to 4. As the component (4), available are mono-, di-, tri- or tetraglycidyl ether of polyhydroxy compounds with preference to bisphenol A diglycidyl ether. The component (4) is present preferably at an amount of 0.1 to 20 parts by weights per 100 weights by part of the total amount of the components (1) and (2) and more preferably 0.1 to 10 parts by weight. For example, the component (4) at an amount more than 20 parts by weight gives too tacky compositions which are not suitable to be molded. On the other hand, if the component (4) is used at too little amounts, there brings about a failure to give sufficient paint adhesion to the end products. In the composition, a reaction between the component (4) and the component (3) takes place to give an epoxy-modified polypropylene resin, leading to an enhancement in the paint adhesion of the end products.

Alternatively, there is therefore provided a polypropylene composition comprising (1) a polypropylene resin, (2) an ethylene/alpha-olefin copolymer elastomer, and a product from the reaction of (3) a low molecular weight polypropylene resin modified with unsaturated carboxylic acid or its anhydride and (4) a reactive epoxy resin, which shows superior paint adhesion.

Optionally, the polypropylene composition of the present invention may comprise additives, including thermal stabilizers, UV stabilizers, slip agents, nucleating agents, talc, glass fibers, clay, mica, wallastonite, calcium carbonate and/or colorants.

The components may be kneaded by use of a conventional machine, such as Banbury mixer, kneader, roll mill, and twin screw extruder. In an embodiment of the present invention, the components (1) to (4) were melt blended and extruded into pellet form by use of a twin screw extruder, such as that sold by W&P, Germany, under the tradename of ZSK-40φ. Needless to be pretreated with, for example, a primer, the propylene resin composition products thus obtained can be coated immediately after cleaning with an aqueous cleansing solvent, such as water.

After cleaning and drying, a paint can be applied on the molded products. Examples of the paint include melamine paints, urethane paints and acryl paints with preference to melamine paints and urethan paints. Of the melamine paints is representative a crosslinked polyester melamine paint suitable for automobile bumpers. As the urethane paint, an acryl urethane paint or a polyester urethane paint, which is of a one or two package type, is available.

Usually, a baking process follows painting. Generally, the painted materials are subjected to baking at 80 to 120° C. for 0.5 to 1 hour. Where a two package type urethane paint is coated on an automobile bumper made of the composition of the present invention, baking at 80° C. for 30 min produces good coating properties. Upon using a melamine paint, baking at 120° C. for 30 min is preferable.

A better understanding of the present invention may be obtained in light of the following examples which are set forth to illustrate, but are not to be construed to limit the present invention.

EXAMPLES I TO III

Using a Henschel mixer, a propylene-ethylene block copolymer with an ethylene content of B% by weight and an MI of 12 g/10 min, an ethylene propylene copolymer elastomer (EPR) with an ethylene content of 75% by weight and a Mooney viscosity of 25 ($ML_{1+4}$, 100° C.), a maleic anhydride-modified low molecular weight polypropylene resin (MA-PP) (with a maleic anhydride content of 3.5% by weight and a melt viscosity of 25DcP (190° C.)), and epoxy resin I (polyethylene glycol diglycidylether, commercially available from Nagasa Chemical, Japan, under the tradename of DENACOL EX-830) were mixed at the prescribed amounts as indicated in Table 1, below. The mixture was fed at a rate of 35 kg/hr to ZSK-40φ twin-screw extruder (L/D=39) and kneaded at 200 to 230° C., and pelletized.

The polypropylene resin pellet thus obtained was injected at 210 to 230° C. as a plaque with a dimension of 355 mm×100 mm×3 mm by use of an injection molding machine (Promix 150, sold by DongShin Oil Pressure, Korea) in which a mold was maintained at 30° C. The plaque was washed with water by use of a spray gun and dried. Subsequently, a two package type urethane paint (Flexibletan F/T 1000, sold by Dongju Industries, Korea) was sprayed at a pressure of 4 kg/cm² onto the plaque by use of a spray gun to form a coat 50 to 60 μm thick, followed by baking the coat at 80° C. for 30 min.

After standing for 24 hours at room temperature, the painted plaque was notched with a cutter knife to form checks each having a dimension of 2 mm square. A plastic adhesive tape(polypropylene tape 50 mm wide, commercially available from SeoTong, Korea, Model No. KSA1514) was firmly attached to the checker squares and then, instantaneously detached therefrom. This procedure was repeated five times. The paint adhesion was evaluated by the number of the checker squares which remained intact on the substrate per 100 checker squares. The results are shown in Table 1, below.

COMPARATIVE EXAMPLE I

The same procedure as that of Example I was repeated, except that the maleic anhydride-modified low molecular weight polypropylene resin (MA-PP) was not used. The results are given in Table 1, below.

COMPARATIVE EXAMPLE II

The same procedure as that of Example I was repeated, except that the maleic anhydride-modified low molecular weight polypropylene resin (MA-PP) was used at an amount of 5 parts by weight. The results are given in Table 1, below.

COMPARATIVE EXAMPLE III

The same procedure as that of Example I was repeated, except that the maleic anhydride-modified low molecular weight polypropylene resin (MA-PP) was used at an amount of 10 parts by weight. The results are given in Table 1, below.

TABLE 1

| | Examples | | | C. Examples | | |
|---|---|---|---|---|---|---|
| Composition | I | II | III | I | II | III |
| PP (wt. %) | 70 | 75 | 80 | 70 | 70 | 70 |
| EPR (wt. %) | 30 | 25 | 20 | 30 | 30 | 30 |
| ¹MA-PP (wt. part) | 20 | 25 | 30 | — | 5 | 10 |
| ¹Epoxy I (wt. part) | 2 | 2 | 2 | 2 | 2 | 2 |
| Paint Adhesion (%) | 100 | 100 | 100 | 0 | 50 | 80 |

¹based on 100 parts by weight of PP and EPR in total.

As apparent from Table 1, absence of or little amounts of the maleic anhydride-modified low molecular weight polypropylene resin result in poor paint adhesion.

EXAMPLES IV TO VI

Together with an acrylic acid-modified low molecular weight polypropylene (AA-PP) (acrylic acid content of 6.5% and melt viscosity of 1,200 cP (190° C.)) instead of the MA-PP, the same polypropylene resin, ethylene-propylene copolymer elastomer and epoxy resin as those in Example I were mixed as indicated in Table 2, below. The paint adhesion was tested in the same manner as in Example I and the results are given as shown in Table 2, below.

COMPARATIVE EXAMPLE IV

The same procedure as that of Example VI was repeated, except that the epoxy resin I was not used. The results are given in Table 2, below.

TABLE 2

| | Examples | | | C. Example |
|---|---|---|---|---|
| Composition | IV | V | VI | IV |
| PP (wt. %) | 80 | 80 | 80 | 80 |
| EPR (wt. %) | 20 | 20 | 20 | 20 |
| ¹AA-PP (wt part) | 20 | 25 | 30 | 30 |
| ¹Epoxy I (wt part) | 2 | 2 | 2 | — |
| Paint Adhesion (%) | 90 | 97 | 100 | 90 |

¹based on 100 parts by weight of PP and EPR in total.

The data of Table 2 show that the epoxy resin plays an important role in improving adhesion properties.

COMPARATIVE EXAMPLE V

The same procedure as that of Example II was repeated, except that a maleic anhydride-modified high molecular weight polypropylene (MA-PP-1) (Admer QFSOOA, MA content 1.5 wt %, MI 3.0 g/10 min, sold by Mistui, Japan) was used instead of the maleic anhydride-modified low molecular weight polypropylene resin (MA-PP). The results are given in Table 3, below.

COMPARATIVE EXAMPLE VI

The same procedure as that of Example II was repeated, except that a low molecular weight polypropylene (PP wax) (LC503N, melt viscosity 85 cP (190° C.), sold by Lion Chemical, Korea) was used instead of the maleic anhydride-modified low molecular weight polypropylene resin (MA-PP). The results are given in Table 3, below.

COMPARATIVE EXAMPLE VII

The same procedure as that of Example II was repeated, except that a maleic anhydride-modified low molecular weight polyethylene (MA-PE) (maleic anhydride content 3.0 wt %, melt viscosity 400 cP(140° C.)) was used instead of the maleic anhydride-modified low molecular weight polypropylene resin (MA-PP). The results are given in Table 3, below.

COMPARATIVE EXAMPLE VIII

The same procedure as that of Example II was repeated, except that an ethylene/methacrylate copolymer (EMA) (methacrylate content 21%, MI 0.4 g/10 min, commercially available from Chevron Chemical under the tradename of SP2202T) was used instead of the maleic anhydride-modified low molecular weight polypropylene resin (MA-PP). The results are given in Table 3, below.

COMPARATIVE EXAMPLE IX

The same procedure as that of Example II was repeated, except that an ethylene/acrylic acid copolymer (EAA)

(acrylic acid content 9.5%, MI 5.0 g/10 min, commercially available from Dow Chemical under the tradename of PRIMACOR 1430) was used instead of the maleic anhydride-modified low molecular weight polypropylene resin (MA-PP). The results are given in Table 3, below.

TABLE 3

| Composition | C. Examples | | | | |
|---|---|---|---|---|---|
| | V | VI | VII | VIII | IX |
| PP (wt %) | 75 | 75 | 75 | 75 | 75 |
| EPR (wt %) | 25 | 25 | 25 | 25 | 25 |
| ¹MA-PP-1 (wt part) | 25 | — | — | — | — |
| ¹PP wax (wt part) | — | 25 | — | — | — |
| ¹MA-PE (wt part) | — | — | 25 | — | — |
| ¹EMA (wt part) | — | — | — | 25 | — |
| ¹EAA (wt part) | — | — | — | — | 25 |
| ¹Epoxy I (wt part) | 2 | 2 | 2 | 2 | 2 |
| Paint Adhesion (%) | 40 | 0 | 60 | 30 | 40 |

¹based on 100 parts by weight of PP and EPR in total.

The poor paint adhesion of the above comparative examples is attributed to the absence of the modified low molecular weight polypropylene resin according to the present invention.

EXAMPLES VII TO IX

Along with talc (KCM 6300, DaeSun Talc, Korea), a propylene-ethylene block copolymer with an ethylene content of 8% by weight and an MI of 25 g/10 min, an ethylene octene copolymer elastomer (ENGAGE 8100, sold by DuPont-Dow Elastomer) with an octene content of 24% by weight and a Mooney viscosity of 23 ($ML_{1+4}$, 121° C.), the maleic anhydride-modified low molecular weight polypropylene resin (MA-PP) or the acrylic acid-modified low molecular weight polypropylene resin (AA-PP), and the epoxy resin I were mixed at the prescribed amounts as indicated in Table 4, below. The paint adhesion was evaluated in the same manner as that of Example I and the results are given in Table 4, below.

TABLE 4

| Composition | Examples | | |
|---|---|---|---|
| | VI | VIII | IX |
| PP (wt %) | 75 | 75 | 75 |
| ENGAGE (wt %) | 25 | 25 | 25 |
| ¹MA-PP (wt part) | 25 | 30 | — |
| ¹AA-PP (wt part) | — | — | 30 |
| ¹Epoxy I (wt part) | 2 | 2 | 2 |
| ¹Talc (wt part) | 10 | 10 | 10 |
| Paint Adhesion (%) | 98 | 100 | 100 |

¹based on 100 parts by weight of PP and EPR in total.

The data of Table 4 show that the ethylene/octene copolymer elastomer plays a same role in attaining the paint adhesion as well as the ethylene/propylene copolymer elastomer and incorporation of talc as an inorganic filler also attains the paint adhesion.

EXAMPLES X TO XIV 100 parts by weight of a mixture consisting of 70% by weight of a propylene-ethylene block copolymer with an ethylene content of 8% by weight and an MI of 16 g/10 min and 30% by weight of an ethylene-propylene copolymer elastomer with an ethylene content of 52% by weight and a Mooney viscosity of 45 ($ML_{1+4}$, 100° C.), 25 parts by weight of the maleic anhydride-modified low molecular polypropylene resin (MA-PP), 15 parts by weight of talc (commercially available from DaeSun Talc, Korea, under the name of KC-1250) and 1 to 3 parts by weight of epoxy resin IT (bisphenol A type, Mw 2000, commercially available from KookDo Chemical Industry, Korea, under the tradename of YD-014) or 1 to 2 parts by weight of epoxy resin III (polypropyleneglycol diglycidyl ether, sold by KookDo Chemical Industry in the tradename of Neoto-D), as indicated in Table 5, below, were homogeneously mixed by use of a Henschel mixer. The paint adhesion was evaluated in the same manner with that of Example I.

COMPARATIVE EXAMPLE X

The same procedure as that of Example X was repeated, except that no epoxy resins were used. The results are given in Table 5, below.

TABLE 5

| Composition | Examples | | | | | C. Emp |
|---|---|---|---|---|---|---|
| | X | XI | XII | XIII | XIV | X |
| PP (wt %) | 70 | 70 | 70 | 70 | 70 | 70 |
| EPR (wt %) | 30 | 30 | 30 | 30 | 30 | 30 |
| ¹MA-PP | 25 | 25 | 25 | 25 | 25 | 25 |
| ¹Epoxy I | 1 | 2 | 3 | — | — | — |
| ¹Epoxy II | — | — | — | 1 | 2 | — |
| ¹Talc | 15 | 15 | 15 | 15 | 15 | 15 |
| Paint Adhesion (%) | 95 | 100 | 100 | 92 | 98 | 75 |

¹wt parts, based on 100 parts by weight of PP and EPR in total.

The data of Table 5 show that the adhesion properties are greatly influenced by the presence or absence of the epoxy resins, but not by their kind.

EXAMPLE XV 100 parts by weight of a mixture consisting of 65% by weight of a polypropylene resin with an ethylene content of 4% by weight and an MI of 25 g/10 min and 35% by weight of an ethylene-octene copolymer elastomer with an octene content of 24% by weight and a Mooney viscosity of 23 ($ML_{1+4}$, 121° C.), 20 parts by weight of a maleic anhydride-modified low molecular polypropylene resin(MA-PP) with a maleic anhydride content of 3.5% by weight, and 2 parts by weight of the epoxy resin I were homogeneously mixed by use of a Henschel mixer. The paint adhesion was evaluated in the same manner to that of Example I, except that the test plaques were treated, in advance, with the surface cleaners as set in Table 6, below. The results are also given in Table 6.

TABLE 6

| Cleaners | Paint Adhesion (%) |
|---|---|
| Water | 100 |
| 0.5% $H_2PO_4$ | 100 |
| 0.5% NaOH | 100 |
| Isopropanol | 60 |
| EXIVENT | 100 |
| Toluene | 95 |

In Table 6, "EXIVENT" is the tradename of a naphthenic hydrocarbon, sold by SK Corporation, Korea. From the data, it is apparent that the products made of the polypropylene resin composition of the present invention show excellent paint adhesion although they are painted immediately after cleaning with water without taking any pretreatment such as primer.

As described hereinbefore, the products formed of the polypropylene resin composition of the present invention, such as automobile bumpers, can be firmly coated with paints without any pretreatment, such as primer, by virtue of the modification with unsaturated carboxylic acid or anhydride and with epoxy resin, so the composition is favorable economically and environmentally.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A polypropylene resin composition superior in paintability, comprising (1) 40 to 99% by weight of a polypropylene resin; (2) 1 to 60% by weight of an ethylene/alpha-olefin copolymer elastomer; (3) 20 to 50 parts by weight of a low molecular weight polypropylene resin modified with unsaturated carboxylic acid or its anhydride, based on 100 parts by weight of the components (1) and (2) in total and (4) 0.1 to 20 parts by weight of an epoxy resin represented by the following chemical formula I based on 100 parts by weight of the components (1) and (2) in total:

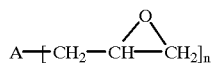

(I)

wherein n is an integer of 1 to 4 and A is a multivalent group having a bond number of n and is selected from the group consisting of bisphenol A ethers, propylene oxide ethers and ethylene oxide ethers.

2. The polypropylene resin composition as set forth in claim 1, wherein said polypropylene resin is selected from the group consisting of crystalline polypropylene homopolymers, propylene/ethylene random copolymers, propylene/ethylene block copolymers, and ethylene/propylene/alpha-olefin terpolymers and has a melt index of 0.5 to 100 g/10 min.

3. The polypropylene resin composition as set forth in claim 1, wherein said ethylene/alpha-olefin copolymer elastomer contains as an alpha-olefin component one selected from the group consisting of propylene, butene-1 and octene-1 and ranges, in Mooney viscosity, from 10 to 100 ($ML_{1+4}$, 100° C.).

4. The polypropylene resin composition as set forth in claim 1, wherein said low molecular weight polypropylene is selected from the group consisting of propylene homopolymers, propylene/ethylene random copolymers, propylene/ethylene block copolymers and the mixtures thereof and said unsaturated carboxylic acid or its anhydride is selected from the group consisting of maleic acid, maleic anhydride, acrylic acid, methacrylic acid, fumaric acid, itaconic acid, crotonic acid, cinnamic acid, citraconic acid and citraconic anhydride.

5. The polypropylene resin composition as set forth in claim 4, wherein said polypropylene resin ranges, in the content of the unsaturated carboxylic acid or its anhydride, from 1 to 20% by weight, in number-average molecular weight, from 2,000 to 30,000 g/mol, and, in melt viscosity (Brookfield viscometer) at 190° C., from 20 to 10,000 cP.

6. The polypropylene resin composition as set forth in claim 1, further comprising an additive selected from the group consisting of thermal stabilizers, UV stabilizers, nucleating agents, slip agents, talc, glass fibers, clay, mica, wallastonite, calcium carbonate, colorants and the mixtures thereof.

* * * * *